B. SANDBERG.
TIRE CHAIN FASTENER.
APPLICATION FILED JAN. 23, 1922.
1,426,510.
Patented Aug. 22, 1922.
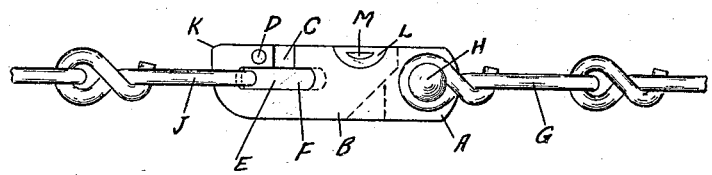
Fig-1-
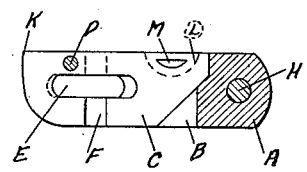
Fig-2-
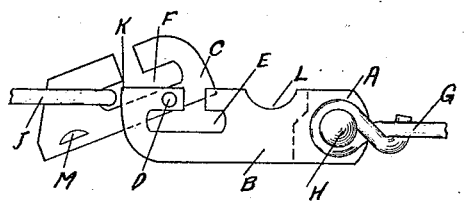
Fig-3-
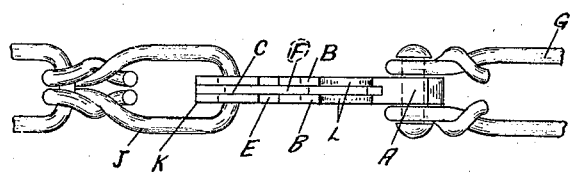
Fig-4-
Inventor
BERNHARD SANDBERG
By A. E. Carlsen.
Attorney

UNITED STATES PATENT OFFICE.

BERNHARD SANDBERG, OF FRENCH LAKE, MINNESOTA.

TIRE-CHAIN FASTENER.

1,426,510.

Specification of Letters Patent. Patented Aug. 22, 1922.

Application filed January 23, 1922. Serial No. 531,071.

*To all to whom it may concern:*

Be it known that I, BERNHARD SANDBERG, a citizen of the United States, residing at French Lake, in the county of Wright and State of Minnesota, have invented certain new and useful Improvements in Tire-Chain Fasteners, of which the following is a specification.

This invention has reference to a new and improved fastener for securing the ends of automobile tire chains, and the principal object is to provide a simple, efficient and practical construction of fastener which, when properly applied to a chain on a vehicle wheel, will securely hold the ends thereof together and will not accidentally become unlocked so that the chain can be lost. Additional objects will be disclosed in the course of the following specification and are illustrated in the accompanying drawing, in which:

Fig. 1 is a side elevation of my improved tire chain fastener, illustrating the manner in which the same is applied to a chain.

Fig. 2 is a detail sectional elevation of the device as seen in Fig. 1, but with the near side portion of the body member proper and the chain removed.

Fig. 3 is an elevation of the fastener, as seen in Fig. 1, but showing it as open.

Fig. 4 is a top plan view of the device as seen in Fig. 1.

Referring now by reference characters to the various figures in the drawing A designates a block having two spaced integrally formed side plates B between which operates a lever C, the same turning on a pivot pin D. The block A is provided with a T-shaped notch E and the lever C is provided with a T-shaped notch F. One end link G of the tire chain is secured to one end of the block A by a pin H, while the link J at the other end of the chain hooks into the notch F when the fastener is open, and when it is closed said link engages in both of the notches E and F. It may here be noted that when the fastener is open (see Fig. 3) the openings in the slots E and F both extend in the same direction, but when the fastener is closed said openings extend in opposite directions so that the link J cannot possibly escape until the lever C is again swung open. It may also be noted that when the fastener is closed the left end of the slot F is slightly shorter than the corresponding end of the slot E. This causes the link J to pull on the lever C and thus tends to hold it securely locked. The other end of the slot F is long enough so that, should the lever get open, as in Fig. 3, the link J can just pass over the corner K and will there remain secure, to a certain extent, from escapement from the lever notch F. The plates B are provided with corresponding recesses L so that the lever, when closed, can be gripped by the fingers or a pair of pliers. The lever itself may be provided with a shall groove M under which an instrument may engage to pry the lever out, if necessary.

It is understood that, although the present disclosure is believed to be the preferred embodiment of the invention, it is not limited thereto, and that various modifications and changes may be made therein, if within the spirit and scope of the appended claims.

Having now therefore fully shown and described my invention, what I claim to be new and desire to protect by Letters Patent is:

1. A fastener consisting of a body member, including spaced plate portions integrally formed at one end, a lever pivoted between said plate portions, said body and lever having longitudinal slots and passages leading thereto adapted to receive a chain link when the lever is in open position and lock the link in the fastener when in closed position, said slot in the lever being slightly shorter at its fore end than the corresponding slot in the body member so as to bring the stress of said link primarily on the lever.

2. A chain fastener consisting of a body member having a notch in its upper edge, a lever pivotally secured in said body member, said lever having a T-shaped notch in one edge thereof, said notches forming a closed slot in the fastener when the lever is closed, the notch in said lever extending far enough from its pivot to allow a link engaging therein to pass an upper end corner of said body member.

3. In a fastener, a body member, including two spaced plate portions connected at one end, a lever pivotally secured between said plate portions near the other end and near one edge of the body member, said lever and plate portions having T-shaped notches opening at opposite edges of the respective members, so that when the fastener is closed said notches form a closed slot therein.

In testimony whereof I affix my signature.

BERNHARD SANDBERG.